US009666074B2

(12) United States Patent
Nicoll et al.

(10) Patent No.: US 9,666,074 B2
(45) Date of Patent: May 30, 2017

(54) METHOD AND SYSTEM FOR VEHICLE PARKING

(71) Applicant: Ford Global Technologies, LLC, Dearborn, MI (US)

(72) Inventors: Douglas Nicoll, Chelmsford (GB); Jonathan Scott, Chelmsford (GB); Will Farrelly, Chelmsford (GB); David Skipp, Brentwood (GB); Richard Brown, London (GB); Eric H. Wingfield, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/803,430

(22) Filed: Jul. 20, 2015

(65) Prior Publication Data

US 2016/0055749 A1 Feb. 25, 2016

Related U.S. Application Data

(60) Provisional application No. 62/040,073, filed on Aug. 21, 2014.

(51) Int. Cl.
*B60Q 1/48* (2006.01)
*G08G 1/14* (2006.01)
*G08G 1/0968* (2006.01)

(52) U.S. Cl.
CPC ....... *G08G 1/143* (2013.01); *G08G 1/096811* (2013.01); *G08G 1/096844* (2013.01); *G08G 1/147* (2013.01)

(58) Field of Classification Search
CPC ............. G08G 1/143; G08G 1/096811; G08G 1/096844; G08G 1/147
USPC ...... 340/932.2, 933, 937, 992; 382/103, 104
See application file for complete search history.

(56) References Cited

U.S. PATENT DOCUMENTS 6,823,317 B1 11/2004 Ouimet et al.
7,492,283 B1 2/2009 Racunas, Jr.
7,516,020 B2 4/2009 Tada et al.
7,538,690 B1 5/2009 Kaplan et al.
8,063,797 B1 11/2011 Sonnabend et al.
8,306,734 B2 11/2012 Mathews
8,374,910 B1 2/2013 Spasokukotskiy
8,484,151 B1 7/2013 Lookingbill
8,521,366 B2 8/2013 Schneider et al.
(Continued)

FOREIGN PATENT DOCUMENTS

CN 102320301 A 1/2012
CN 202584422 U 12/2012
(Continued)

OTHER PUBLICATIONS

UK Search Report dated Oct. 1, 2015 (4 pages).
(Continued)

*Primary Examiner* — Daryl Pope
(74) *Attorney, Agent, or Firm* — Frank A. MacKenzie; Bejin Bieneman PLC

(57) ABSTRACT

A request to identify a parking spot is received. A response to the request, including an identification of at least one available parking spot, is provided. A parking spot selected from the response is identified. Data relating to the selected spot are collected. A user profile based on the collected data is updated.

17 Claims, 3 Drawing Sheets

(56) References Cited

U.S. PATENT DOCUMENTS

| | | | |
|---|---|---|---|
| 8,635,018 | B2 | 1/2014 | Chia et al. |
| 2005/0280555 | A1 | 12/2005 | Warner, IV |
| 2006/0250278 | A1 | 11/2006 | Tillotson et al. |
| 2007/0040701 | A1 | 2/2007 | Browne et al. |
| 2007/0174112 | A1 | 7/2007 | Thorson |
| 2008/0048885 | A1 | 2/2008 | Quinn |
| 2010/0302067 | A1 | 12/2010 | Goldman et al. |
| 2010/0302068 | A1 | 12/2010 | Bandukwala |
| 2011/0133957 | A1 | 6/2011 | Harbach et al. |
| 2011/0213672 | A1 | 9/2011 | Redmann et al. |
| 2011/0241898 | A1 | 10/2011 | Busch |
| 2012/0056758 | A1* | 3/2012 | Kuhlman ................. G08G 1/14 340/932.2 |
| 2012/0083960 | A1* | 4/2012 | Zhu ...................... G05D 1/0214 701/23 |
| 2012/0092190 | A1 | 4/2012 | Stefik et al. |
| 2012/0188100 | A1 | 7/2012 | Min et al. |
| 2012/0245981 | A1 | 9/2012 | Volz |
| 2012/0299747 | A1 | 11/2012 | Schubert et al. |
| 2012/0299749 | A1 | 11/2012 | Xiao et al. |
| 2013/0018541 | A1 | 1/2013 | Raz et al. |
| 2013/0057686 | A1 | 3/2013 | Genc et al. |
| 2013/0073350 | A1* | 3/2013 | Blustein ................... G08G 1/14 705/13 |
| 2013/0159070 | A1 | 6/2013 | Salamone |
| 2013/0176147 | A1 | 7/2013 | Anderson et al. |
| 2013/0231824 | A1* | 9/2013 | Wilson ................. G05D 1/0088 701/26 |
| 2013/0257632 | A1 | 10/2013 | Harber et al. |
| 2013/0265419 | A1 | 10/2013 | Bulan et al. |
| 2013/0293394 | A1 | 11/2013 | Rubin et al. |
| 2014/0006112 | A1 | 1/2014 | Odinak |
| 2014/0176348 | A1 | 6/2014 | Acker, Jr. et al. |

FOREIGN PATENT DOCUMENTS

| | | | |
|---|---|---|---|
| CN | 2008340 | U | 7/2013 |
| DE | 102008028550 | A1 | 12/2009 |
| DE | 20201001153 | U1 | 1/2012 |
| DE | 2010043742 | A1 | 6/2012 |
| DE | 102011003772 | A1 | 8/2012 |
| DE | 102012023110 | A1 | 6/2014 |
| EP | 213664 | A2 | 12/2009 |
| EP | 2267681 | A1 | 12/2010 |
| EP | 2327608 | A1 | 6/2011 |
| EP | 2659450 | | 7/2012 |
| EP | 2597016 | A1 | 5/2013 |
| EP | 2869282 | A1 | 5/2015 |
| JP | 2004288064 | A | 10/2004 |
| JP | 2013206313 | A | 10/2013 |
| KR | 20110105124 | A | 9/2011 |
| KR | 20130019908 | A | 2/2013 |
| TW | 201346844 | A | 11/2013 |
| WO | 0011629 | | 3/2000 |
| WO | 2009079779 | A1 | 7/2009 |
| WO | 2009125350 | A2 | 10/2009 |
| WO | 2010132677 | A1 | 11/2010 |
| WO | 2013037053 | A1 | 3/2013 |
| WO | 2013038198 | A2 | 3/2013 |
| WO | 2013074868 | A1 | 5/2013 |
| WO | 2013086140 | A1 | 6/2013 |
| WO | 2013088431 | A1 | 6/2013 |
| WO | 2014014331 | A1 | 1/2014 |

OTHER PUBLICATIONS

Themann et al., "Prediction of driver behaviour by situational models in a cooperative environment to optimize energy efficiency", 9$^{th}$ ITS European Congress, Dublin, Ireland, 4/7 Jun. 2013, TP 0065, 9 pages.

* cited by examiner

METHOD AND SYSTEM FOR VEHICLE PARKING

CROSS-REFERENCE TO RELATED APPLICATION

This application claims priority to U.S. Provisional Application Ser. No. 62/040,073 filed Aug. 21, 2014, which is hereby incorporated herein by reference in its entirety.

BACKGROUND

A user may reach a recommended parking spot and choose to not park in the spot based on one or more criteria other than the location or the price of the spot. For example, a user may not be comfortable executing a parallel-parking maneuver and may prefer to park in a location that is further away and/or more expensive, rather than parallel parking. As another example, a user may not be comfortable parking in a tight spot, i.e., a spot with little distance between a vehicle and neighboring vehicles, as they may feel that they could inadvertently scratch or dent a neighboring car while trying to unload passengers or cargo from the vehicle. Likewise, there may be various considerations that a user factors in when selecting the final parking spot, the considerations varying from person to person, as well as conditions prevalent during the time of parking.

DETAILED DESCRIPTION

Figure 1:
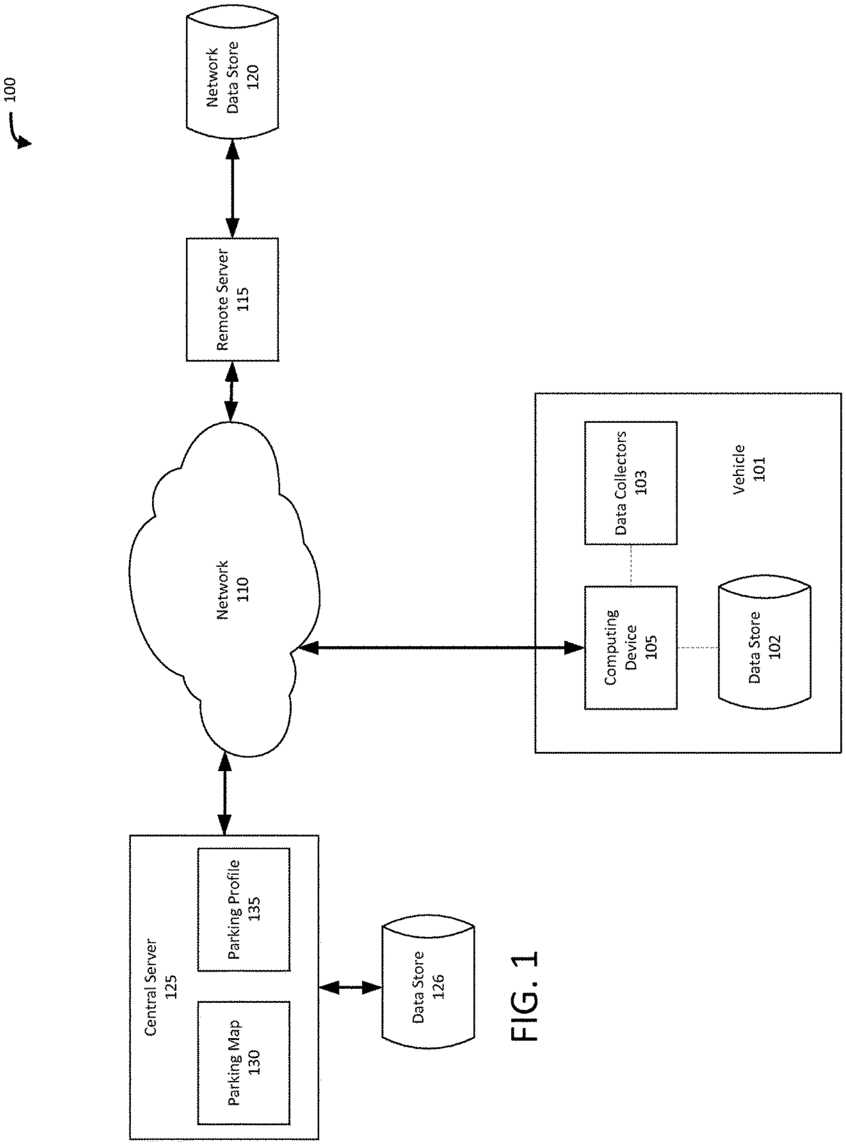
FIG. 1 is a block diagram of an exemplary system for vehicle parking.

In one example parking options may be displayed to a driver, by tracking and learning a driver's parking behavior and providing parking information, e.g., information identifying available parking, based on the learned behavior. For example, a driver may submit a parking request, e.g., via a network to a central server. The request may include one or more of a location (or zone) where parking is required, a duration for which parking is required, how much the user is willing to spend on parking (e.g., an upper limit of acceptable parking expense), constraints (e.g., if they are willing to sacrifice cost of parking to get the desired location or if they are willing to sacrifice location of parking to get the desired cost), etc. The parking request may be submitted by the user to the central parking server over a network, such as via interactions on a parking application running on a personal device (e.g., smart phone) of the user. The parking server may be located at a remote location or simple a so-called cloud based virtual server. In any case, the central server generally includes a processor and a memory, the memory storing instructions executable by the processor.

Based on the user's criteria in a request, and/or using learned user behavior, the parking server may display parking options to the user on a display, such as a display on the center console of the user's vehicle, or on their smart phone. The parking options may include possible locations and their prices. Once a selection is made by the user, the user may be provided with navigational instructions, including turn-by-turn steps, for reaching the selected parking spot. Upon reaching the destination, the parking server may then learn whether the user parked in the selected parking spot or not, for example, by communication with the vehicle's navigation system, an in-vehicle sensor or dongle, or by communication with the user's smart phone.

As an example, data pertaining to the parking behavior of the user may be collected on the driven vehicle included in the parking network via multiple vehicle data collecting elements. The data collecting elements may include, for example, one or more vehicle sensors, such as front or rear sensors, radars, cameras, etc. In addition, data may be collected on the vehicle via a portable dongle coupled to the vehicle, the dongle moved between vehicles by the vehicle user. Data may also be collected by a portable device of the user such as a smart phone left in the vehicle during driving. Further still, data may be collected via an in-car camera having RCM and video data input. The data may be collected for a user while the user is operating a personal vehicle and/or while operating a shared vehicle.

For a given user, the collected data is used to learn a parking behavior as a function of vehicle being driven. (e.g., size and type of vehicle, as well as which park assist features were available on the vehicle), as well as weather conditions, traffic conditions, location, route, etc. The data collected may include data pertaining to parking maneuvers, as well as the context of the parking maneuvers. The parking data collected on the vehicle may be uploaded to the central parking server via the network. The parking data of the given driver is then used to update the user's parking profile stored on the central server.

The user profile may include user parking preferences and settings selected by the user in addition to parking behavior data, parking maneuver data, etc. Based on data collected on the vehicle during driver parking (or not parking) at the selected spot, and data uploaded to the user parking profile stored on the central server, the parking selections displayed to a user on the next parking request may be adjusted. The central parking server may also receive information pertaining to traffic conditions, weather conditions, and other route related information. The received information may be downloaded to a navigation server and processed, for example, when a user requests navigational assistance to the selected parking spot.

As such, the central server may also receive parking requests from one or more second vehicles and parking availability data for a plurality of parking spots concurrently. Based on the parking requests and the parking availability data, the server may configure parking schedules for users on the parking network.

If a user does park in a selected parking spot, attributes for the parking spot may be learned and stored in the user's parking profile. For example, it may be learned if the user parked straight in or at an angle, if the user parked via parallel parking, a number of attempts made by the user to park the vehicle in the spot, space between user's vehicle and neighboring vehicles on either side, etc. If the user does not park in the selected spot, such as determined by the user arriving at the spot and then driving away from the spot, or based on the user submitting a new request for finding a parking spot, attributes of the parking spot may be collected and stored in the user's profile to indicate attributes that the user does not like in a parking selection.

Upon receiving a subsequent parking request, such as at a later time, the parking selections displayed to the user may be based not only on the location and price criteria submitted by the user, but also based on the learned parking behavior of the driver. For example, results corresponding to the given location and/or price criteria may be listed with the results better matching the learned parking behavior of the user listed higher than those that do not match the learned parking behavior.

The parking behavior of the user may also be learned contextually. For example, the user may display a distinct parking behavior when parking in downtown locations as compared to suburban locations. As another example, the user may park more aggressively in parking garages as compared to roadside locations. As yet another example, the parking behavior may be learned in the context of the type of vehicle being driven by the user. This may be particularly important when the driver uses a vehicle of a shared vehicle system where the type, make and model of vehicle assigned to the user can vary each time the user requests a vehicle. For example, the user may be more comfortable parallel parking a compact car as compared to a minivan. As yet another example, the parking behavior may be different during daytime (when ambient light is more) as compared to nighttime (when ambient light is less). For example, during nighttime, the user may prefer to park a vehicle at a location closer to a light post (or other source of light). Likewise, during nighttime, the user may not wish to park in parking spots that are relatively isolated. Thus, it may be learned to display results with parking spots closer to a light post ranked higher, particularly when the user requests nighttime parking. The parking behavior is learned based on a user's history, and is used to update the parking selections displayed to a user when parking is requested in future. In this way, parking options may be customized for a user based not only on their specific parking requirements but also based on their historical parking behaviors and patterns.

In some examples, the user may actively provide a commentary on the parking selection. For example, the user may provide a parking commentary in real time via an application running on their smart phone. The user's parking commentary may include, for example, a picture of the parking spot that was suggested to the driver but not used by the driver, as well as a comment as to why they did not choose it. For example, the user may post a picture of the parking spot and comment that "the spot is too tight to parallel park an SUV, but I might be able to parallel park a compact car". The user may likewise comment on parking spots they do like and use and indicate which attributes of the parking spot they did enjoy. Further still, the commentary may include a rating of the parking spot (or parking spot score) assigned by the user. The user's parking profile may be accordingly updated to reflect the learned parking behavior and preferences.

There may be various reasons why the user does not park at a selected spot. Based on the commentary, attributes of the parking spot may be learned. For example, a user may not park at a selected spot during rain or inclement weather conditions due to lack of a covering. The server may then learn to adjust the parking selection displayed to a user in future based on ambient weather conditions, specifically, by recommending covered parking during foul conditions while recommended open air parking during fair weather conditions. As another example, the user may not like parking at a spot due to a substantial distance to the parking meter. The server may then learn to adjust the parking selection displayed to a user in future so that spots closer to the parking meter, and/or parking options with on-line payment availability (so that the user does not have to go to a parking meter) are displayed first. As another example, the user may not select a parking spot when the vehicle passengers include kids due to high traffic flow in the vicinity of the parking spot. The passenger information may be learned, as an example, based on the ambient noise level in the car and/or the type of car being driven (e.g., child passengers may be more likely when the vehicle being driven is a minivan as compared to a sports car). Thus, during future parking requests received when the ambient noise level in the car is higher, parking spots away from high traffic flow zones may be displayed and ranked higher.

Based on the gathered data, the central server may also push updated parking recommendations or notifications to the user, for example, in real-time. For example, the server may push recommendations to the user about alternate parking spots that may better match the driver's parking driving behavior and preferences once it is determined that the user did not park at the selected parking spot. The recommendations may be provided to a user on a display of the vehicle, or on a display of a personal device (e.g., smart phone) of the driver in the vehicle.

FIG. 1 illustrates a system 100 for vehicle parking. The system includes a vehicle 101. The vehicle 101 includes a computing device 105 having a data store 102 and a plurality of data collectors 103.

The data store 102 may be of any type such as is known to store data as described herein, e.g., one or more volatile or non-volatile computer readable media. The data collectors 103 may include sensors, cameras, etc. to send data to the computing device 105 and the data store 102. The computing device 105, the data collectors 103, and the data store 102 may be communicatively coupled to a vehicle network, e.g. a controller area network (CAN) bus or the like.

The system 100 includes a network 110 having a remote server 115 and a network data store 120. The network 110 includes one or more known technologies, e.g., the network 110 may include one or more of wireless communication networks (e.g., using Bluetooth, IEEE 802.11, etc.), a cellular network, local area networks (LAN) and/or wide area networks (WAN), including the Internet, etc., providing data communication services.

The remote server 115 and the network data store 120 may be of any suitable type, e.g., hard disk drives, solid-state drives, servers, or any volatile or non-volatile media. The remote server and the network data store may store data sent over the network 110.

The system 100 includes a central server 125 including a data store 126, a plurality of parking maps 130, and a plurality of parking profiles 135. The central server 125 and the data store 126 may be of any suitable type, e.g., hard disk drives, solid-state drives, servers, or any volatile or non-volatile media.

Figure 2:
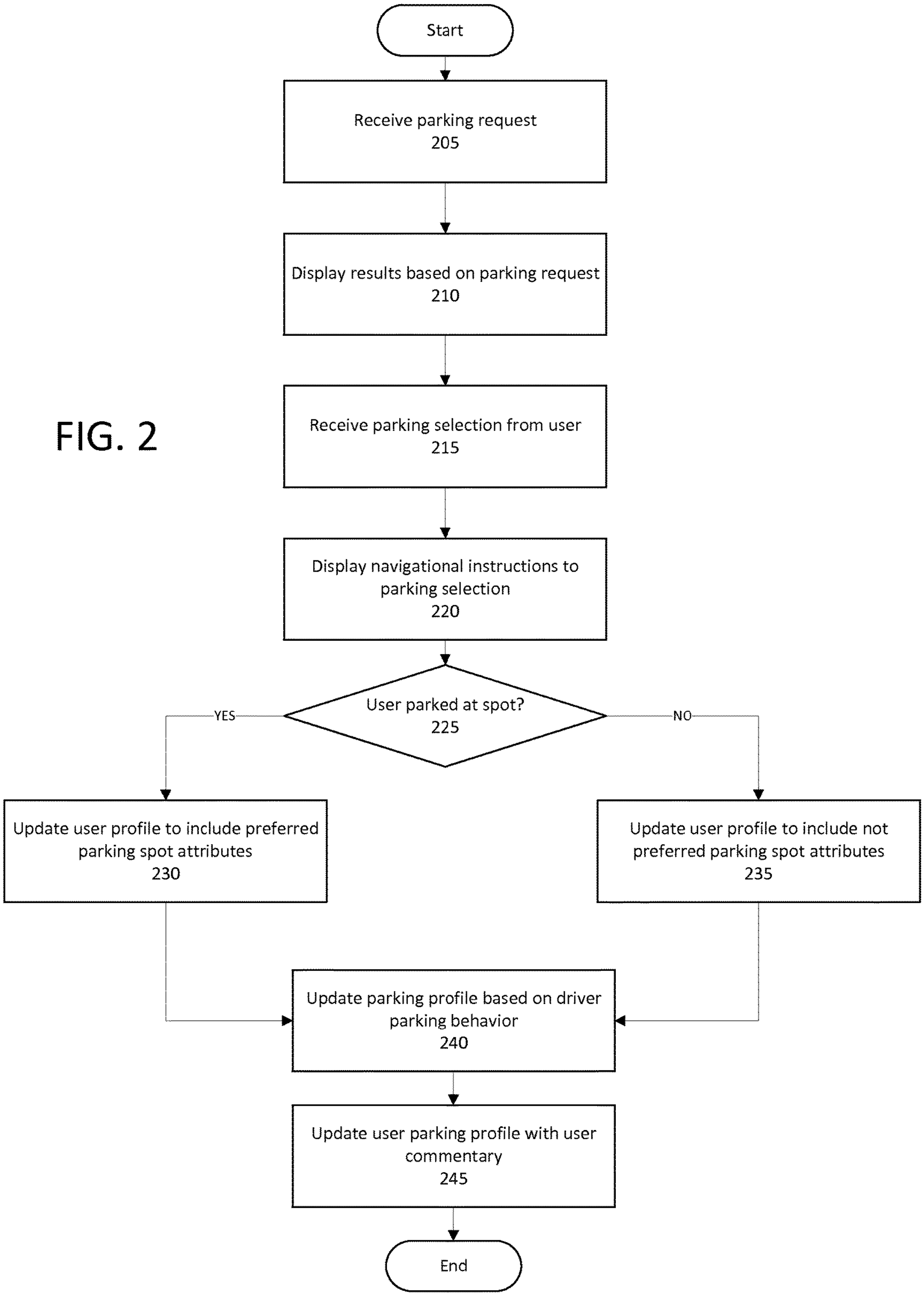
FIG. 2 is an exemplary process for offering parking options.

FIG. 2 illustrates a process 200 for analyzing driver behavior and offering parking spots. The process 200 starts in a block 205, where the central server 125 receives a parking request from the computing device 105 of the vehicle 101.

Next, in a block 210, the central server 125 sends a plurality of results based on the parking request. The results are based at least in part on prior user behavior, preferred parking attributes, proximity to the vehicle 101, etc. For example, the central server 125 may use learned user behavior from the parking profile 135 to tailor the results to those most similar to parking spots used previously.

Next, in a block 215, the user selects one of the plurality of results, and the central server 125 receives the parking selection from the user. The selection may be submitted over the network 110 from the vehicle 101 itself or from a user device, e.g., a mobile device such as a tablet, smartphone, cellular telephone, etc.

Next, in a block 220, the central server 125 sends navigational directions to the selected parking spot to the computing device 105. The computing device 105 may display the directions on, e.g., a vehicle display, or on a user device, etc.

Next, in a block 225, the central server 125 determines whether the user has parked in the selected parking spot. The computing device 105 may use data collected from the data collectors 103 to determine whether the vehicle 101 has parked in the selected parking spot, whether the user has rejected the parking spot, and/or whether the vehicle 101 has moved past the selected parking spot. If the user has parked in the selected parking spot, the process 200 moves to a block 230. Otherwise, the process 200 moves to a block 235.

In the block 230, the central server 125 updates the parking profile 135 to include attributes of the selected parking spot. Specifically, the central server 125 puts attributes of the parking spot, e.g., proximity to road, covered or not covered, fee, etc., in the "preferred" attributes portion of the parking profile 135. The updated parking profile 135 will be used to seek more preferred parking spots for future requests. The process 200 then continues in a block 240.

In the block 235, the central server 125 updates the parking profile 135 to put the attributes of the selected parking spot in the "disfavored" attributes portion of the parking profile. The updated parking profile 135 will seek to remove parking spots with disfavored attributes for future requests. The process 200 then continues in the block 240.

In the block 240, the central server 125 updates the parking profile 135 based on the user's parking behavior. Specifically, the computing device 105 collects data from the data collectors 103 and sends the data to the central server 125 over the network 110, where the central server 125 updates the parking profile 135 based on the data. The data may include vehicle speed, direction, braking start and stop times, proximity to other vehicles, proximity to non-vehicle objects, etc. For example, if the user took several attempts to park in the spot (e.g. in a small space or for parallel parking), then the behavior in the parking profile 135 will be updated accordingly.

Next, in a block 245, the central server 125 updates the parking profile 135 with user commentary, and the process 200 ends. The user may, after parking the vehicle 101, submit user commentary on the selected parking spot. For example, the user may comment that the spot is too expensive, rightly priced, too near major roads, far from the intended destination, etc. The commentary may include a picture of the spot and/or a rating, which are updated to the parking profile 135 for future selections.

Figure 3:
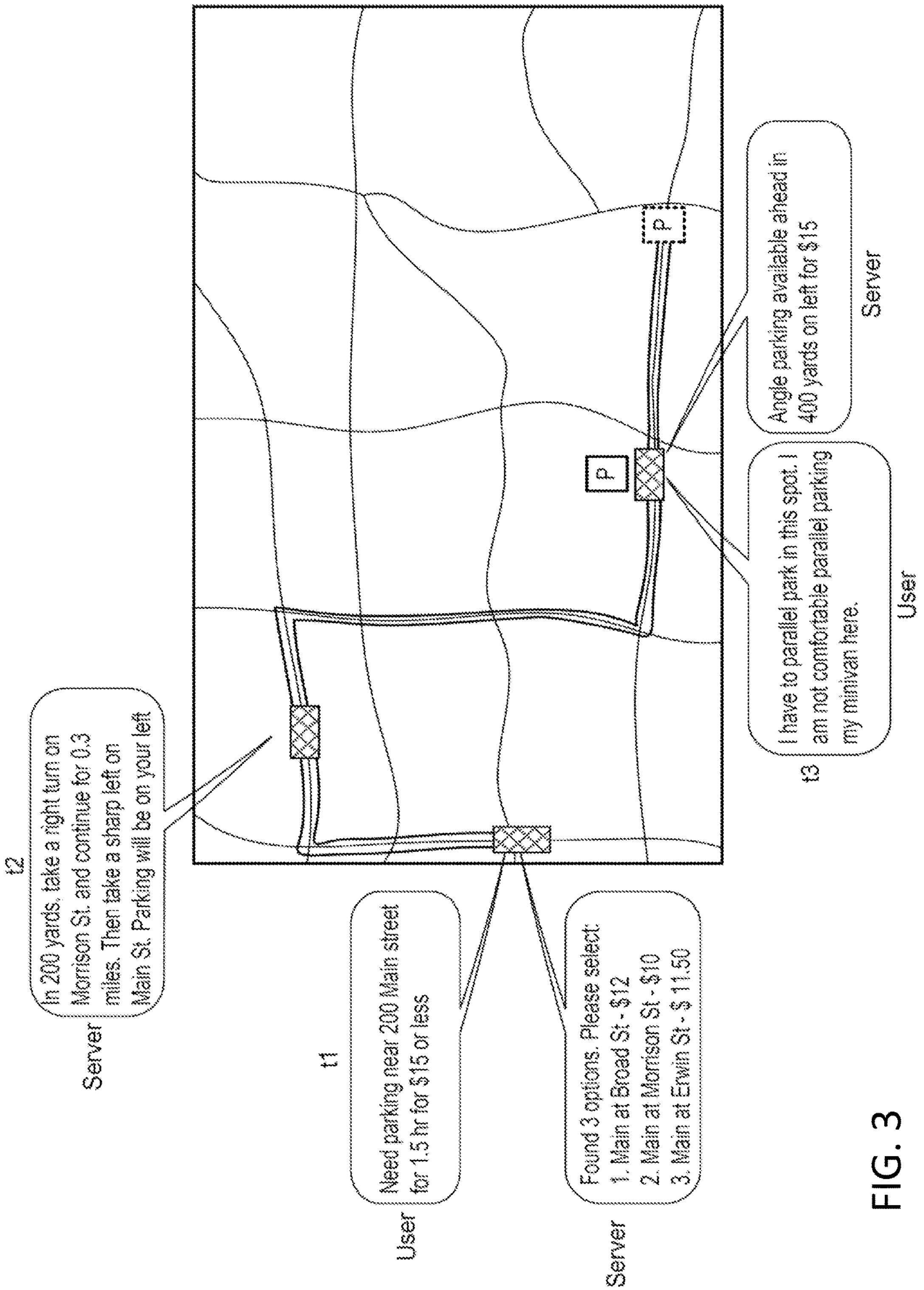
FIG. 3 is an exemplary view of the system for vehicle parking.

FIG. 3 illustrates an exemplary view of the system for vehicle parking. At time t1, the user requests a parking spot for the vehicle 101. The server 125 then provides a plurality of parking spots available for the user to park.

At time t2, the user has selected one of the spots, and the server 125 provides directions to the selected parking spot. The directions may be displayed on a navigation system of the vehicle 101.

At time t3, the user has arrived at the selected parking spot, but the spot is disfavored. Specifically, the spot requires the user to parallel park, which the user does not want to do. The server 125 then finds another spot and directs the user to park the vehicle 101 in the new spot. The server 125 then updates the parking profile to put "parallel parking" as a "disfavored" parking spot attribute.

Computing devices such as those discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A system, comprising a computer including a processor and a memory, the memory storing instructions executable by the processor to:

receive a request to identify a parking spot;

provide a response to the request, including an identification of at least one available parking spot;

identify a parking spot selected from the response;

collect information relating to the selected parking spot; and update a user profile based on the collected information;

wherein the collected information include at least one of ambient weather conditions, covering of the parking spot, online payment availability, local traffic flow, changes of the selected parking spot, route, parking maneuvers required, and ambient noise, and wherein the parking maneuvers include at least one of parallel parking, angle of vehicle after parking, and number of attempts made to park in the parking spot.

2. The system of claim 1, wherein the instructions further include instructions to send navigational instructions to the selected parking spot.

3. The system of claim 1, wherein the user profile includes preferred user attributes and disfavored user attributes.

4. The system of claim 3, wherein the instructions include instructions to sort the collected data in the user profile into the preferred user attributes and the disfavored user attributes.

5. The system of claim 1, wherein the instructions further include instructions to determine if the user parked at the selected parking spot.

6. The system of claim 5, wherein the instructions further include instructions to, based on whether user parked in the selected spot, sort the collected data into at least one of preferred user attributes and disfavored user attributes.

7. The system of claim 5, wherein the instructions further include instructions to identify a new parking spot if the user does not park in the selected parking spot.

8. The system of claim 7, wherein the instructions further include instructions to identify the new parking spot having information different than the previous selected spot.

9. The system of claim 1, wherein the instructions further include instructions to collect the information with at least one data collector.

10. The system of claim 9, wherein the data collectors include at least one of a camera, radar, portable dongle, and a user device.

11. The system of claim 1, wherein the instructions further include instructions to update the user profile based on a user commentary.

12. A method, comprising:

receiving a request to identify a parking spot;

providing a response to the request, including an identification of at least one available parking spot;

identifying a parking spot selected from the response;

collecting data relating to the selected spot; and updating a user profile based on the collected data;

wherein the collected information include at least one of ambient weather conditions, covering of the parking spot, online payment availability, local traffic flow, changes of the selected parking spot, route, parking maneuvers required, and ambient noise, and wherein the parking maneuvers include at least one of parallel parking, angle of vehicle after parking, and number of attempts made to park in the parking spot.

13. The method of claim 12, further comprising sending navigational instructions to the selected parking spot.

14. The method of claim 12, wherein the user profile includes preferred user attributes and disfavored user attributes.

15. The method of claim 12, further comprising determining if the user parked at the selected parking spot.

16. The method of claim 12, further comprising collecting the information with at least one data collector.

17. The method of claim 12, further comprising updating the user profile based on a user commentary.

* * * * *